Nov. 8, 1932.　　　J. J. SPAETH　　　1,887,334
CULTIVATOR
Filed May 14, 1931　　2 Sheets-Sheet 1
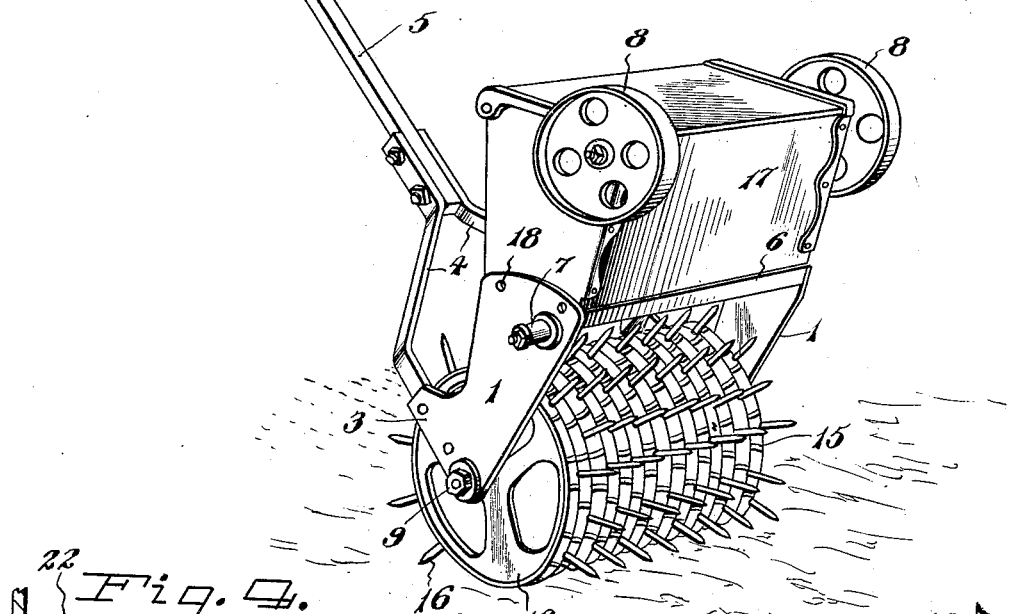
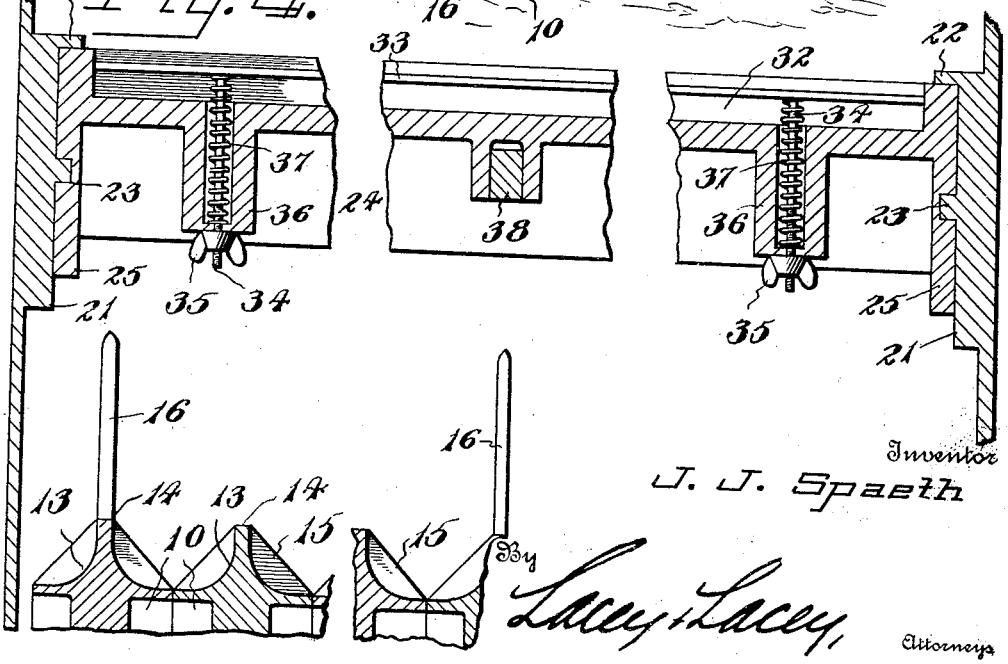
Inventor
J. J. Spaeth
By Lacey & Lacey
Attorneys Nov. 8, 1932.   J. J. SPAETH   1,887,334
CULTIVATOR
Filed May 14, 1931   2 Sheets-Sheet 2
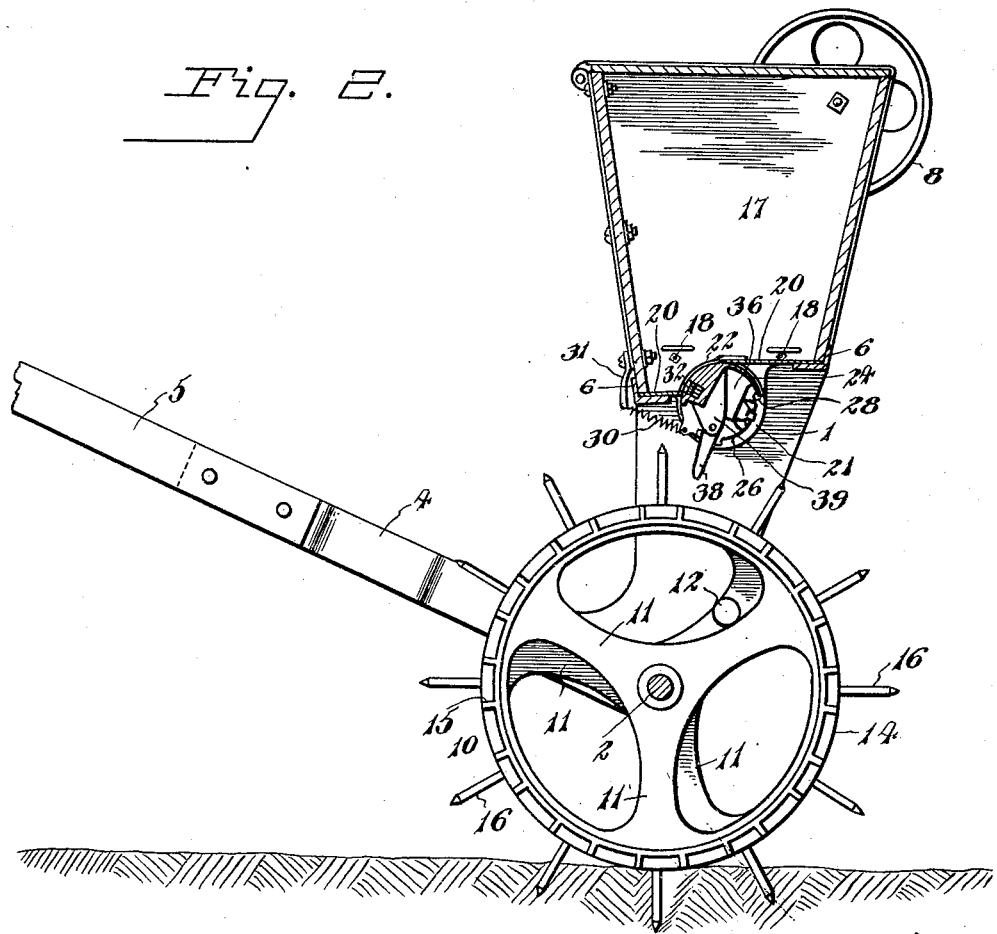
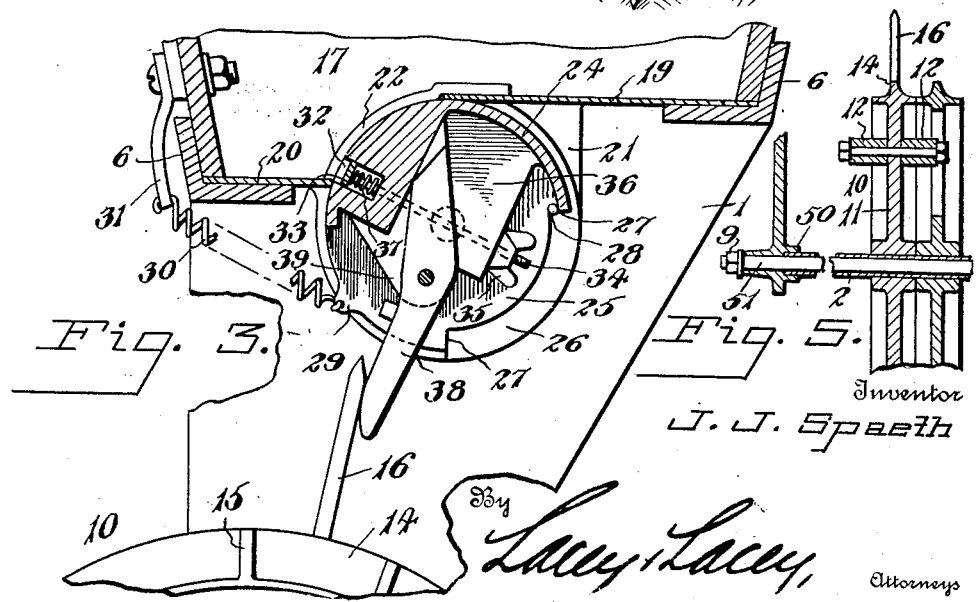

Patented Nov. 8, 1932

1,887,334

UNITED STATES PATENT OFFICE

JOHN J. SPAETH, OF SALINA, KANSAS, ASSIGNOR TO THE F. WYATT MANUFACTURING COMPANY, OF SALINA, KANSAS, A CORPORATION OF KANSAS

CULTIVATOR

Application filed May 14, 1931. Serial No. 537,457.

This invention relates to tilting instruments and has special reference to instruments for cultivating lawns. The object of the invention is to provide means whereby, as the implement is drawn over a lawn, the top soil will be broken and pulverized to form a fine mulch through which moisture may readily pass and in which will be formed openings whereby fertilizer and seed may penetrate below the surface to produce a smooth velvety lawn. The invention also has for its object the provision of means whereby seed may be spread to germinate and increase the thickness and evenness of the lawn. The invention, moreover, seeks to provide an implement having the stated characteristics, which may be easily drawn over the ground and which may be reversed or inverted when further cultivation is not desired so that the implement may be easily drawn to another point of use or to a place of storage. These stated objects and other objects which will incidentally appear in the course of the following description are attained in such an apparatus as is illustrated in the accompanying drawings, and the invention resides in certain novel features which will be particularly pointed out in the appended claims.

In the drawings,

Figure 1 is a perspective view of an implement embodying the invention,

Fig. 2 is a view partly in side elevation and partly in vertical longitudinal section, Fig. 3 is an enlarged section through the lower portion of the seed box.

Fig. 4 is a longitudinal section through the seed-depositing roller, and

Fig. 5 is a detail transverse section of a portion of the cultivating roller.

In carrying out the invention, there is provided a frame consisting of side or cheek plates 1 which are of a general triangular formation provided with openings at their lower ends to receive an axle 2 on which the cultivating roller is mounted. Extending rearwardly from the lower ends of these side plates are arms 3 to which are attached hounds 4 which converge upwardly and rearwardly and are secured to the lower end of a push bar 5 whereby the user may propel the implement over the ground. The upper ends of the cheek plates are connected by cross bars 6 which may conveniently be angle bars and are secured to the upper ends of the side plates or formed integral therewith, as may be preferred and as may be found most advantageous. At the upper forward corners of the side plates are studs 7 on which rollers 8 may be mounted to form supports for the implement when it is inverted after the cultivation of the lawn has been completed.

The hollow axle 2 has its ends fitted in bearing bosses 50 on the inner faces of the side plates, as shown in Fig. 5, and it is reinforced by a rod 51 which extends through the axle and the side plates and is secured by nuts 9 or other means. Mounted upon the axle is a roller consisting of a plurality of similar narrow disks or wheels 10 arranged side by side through the entire length of the axle between the side plates. Each disk or wheel consists of a circular rim formed integral with or carried by radial arms 11 which are rotatably fitted upon the axle, as will be understood. The center wheel or disk is provided upon one spoke or radial arm 11 with lateral lugs 12 which project into spaces between the spokes of the adjacent disks or wheels to be engaged by the forward edges of spokes or arms of said wheels, as will be understood upon reference to Figs. 2 and 5, so that as the machine is pushed forward the traction necessary to turn the roller in the seed box will be provided. When the device is sold without the seed box, the lugs 12 may be omitted. The periphery of each wheel or disk is tapered outwardly in cross section, as shown at 13, to form a central ridge 14 adapted to break up the crust of the soil and form the same into narrow ridges, thereby aiding in the formation of the desired mulch. At intervals around the peripheries of the several wheels are formed cross bars 15 which also penetrate the ground and break up the crust and thoroughly pulverize the surface soil. These cross bars also serve as carriers or supports for seed, as will presently appear. Each wheel has projecting radially from its periphery a plurality of teeth 16 which, as will be clearly understood upon reference to Fig. 2, project some appreciable distance from the wheels and are pointed at their free ends whereby they will readily penetrate the soil and form small openings therein in which seed or fertilizer may be deposited. These teeth 16 may be formed separately from the wheels and bolted, welded, or otherwise secured thereto, but I prefer to cast them integral with the wheels so that they form a part of the wheels and cannot be easily detached therefrom.

The cross bars 6 are adapted to receive and support a seed box 17 which, as shown in Figs. 2 and 3, will fit between the upstanding webs or flanges of said cross bars and rest upon the horizontal webs thereof and will also fit between the upper extremities of the side plates 1 and may be secured to said side plates by screws or bolts, as indicated at 18. The cross bars provide means, also, for adding weight to facilitate penetration by the teeth when the soil is hard. The bottom of the seed box is of a stepped formation and the bottom plates 19 and 20 are separated vertically as well as horizontally, as shown in Figs. 2 and 3, whereby a discharge opening is provided between the inner edges of said plates. On each end plate of the seed box is a depending bracket or support 21 on the forward portion of which is an arcuate flange or guard 22 which extends up over the front inner edge of the rear bottom plate 19 and thereby aids in maintaining the proper position of the several parts. These brackets or supports 21 are provided each with a stud 23 which is concentric with the flange 22 and constitues a pivotal support for the seed-dropping roller 24, said roller having end disks 25 formed with central sockets to engage over the respective studs 23, and also having a peripheral recess or cut away portion, indicated at 26, whereby spaced shoulders 27 are produced which may engage a stop pin or stud 28 on the respective bracket to limit the rotary movement of the roller. At a point spaced from the recess 26, each end disk 25 is provided with a lug 29 to which is attached one end of a retractile spring 30 which extends rearwardly under the seed box and is attached to a bracket 31 on the rear side of the latter, whereby the roller is normally held in the position shown in Figs. 2 and 3. Extending longitudinally of the roller is a pocket 32, and disposed within this pocket is a seed plate or ejector 33 adjacent the ends of which are fixed stems 34 which extend diametrically through the roller and are equipped at their free ends with wing nuts 35 adapted to be turned home against the roller or against bosses 36 thereon. Expansion springs 37 are fitted around each stem 34 between the ejector bar 33 and the body of the roller or the bottoms of the bosses 36 through which the stems extend, so that these springs serve to hold the seed bar yieldably in a set position and the tension of the springs may be easily adjusted by turning the wing nuts in an obvious manner. When the roller is in the position illustrated in Figs. 2 and 3, seed in the seed box will flow into the pocket 32 and will fill the same over the ejector bar and, as the roller rocks, the pocket will be brought below the bottom of the seed-containing box and the seed consequently discharged onto the cultivating roller. To effect the rocking of the seed roller, a trip arm 38 is pivoted to the roller or to lugs 39 thereon and is so proportioned that its lower end will depend into the path of the teeth 16 in the central row of teeth upon the roller, while its upper end tends to bear against the body of the seed roller. It will be understood that when the cultivating roller is turning in the proper direction, while the machine is being pushed over the ground, the teeth 16 of the central row will successively engage the lower projecting end of the trip arm 38 and will rock the roller so as to discharge the seed, the spring 30 returning the roller to its normal position when the trip arm clears the engaged tooth. Should the machine for any reason be moved backwardly so that a reverse movement will be imparted to the cultivating roller, the trip arm will yield to the engaging teeth and no movement will be imparted to the seed roller.

The seed box is provided at its upper forward corners with studs similar to the studs 7 upon which the wheels 8 may be mounted, as shown, so that when the tool is to be moved to another point of use or to a place of storage, it may be inverted and supported upon said wheels 8.

It will be understood from what has been said that the cultivating roller may be used with or without the seed box, and its action in breaking up the earth crust and surface soil will be the same in either instance. When the seed box is in use, seed may be sown at the same time that the ground is cultivated, and the seed will be dropped at intervals by reason of the engagement of the trip arm of the seed roller by teeth of the cultivating roller in the manner described. When seed is dropped by the seed roller, it will fall upon the peripheries of the disks or wheels constituting the cultivating roller and will be held against immediate passage to the ground by the several ribs or cross bars 15 until the rotation of the cultivating roller has brought said cross bars or ribs to a point below the center of the cultivating roller, whereupon the seed will be efficiently broadcast and scattered upon the ground. Fertilizer may be distributed in the same manner and, if desired, may be spread at the same time the seed is sowed. Inasmuch as the teeth 16 and the ribs or cross bars 15 penetrate the surface of the ground constantly during the dropping of the seed, the ground will be cultivated simultaneously with the planting of the seed and the seed will readily pass to the desired depth in the soil so that it will readily germinate and produce growth. By providing a plurality of independently rotating narrow wheels, tearing of the turf in turning the implement is avoided. When turning some of the wheels may turn backward. The implement is very simple in the construction and arrangement of its parts and may be easily manipulated and is highly advantageous for the particular purpose for which it is designed.

Having thus described the invention, I claim:

1. A tilling implement including a cultivating roller which consists of a plurality of rotatable wheels arranged side by side, the center wheel being provided on each side with a lateral lug to be engaged by spokes of an adjacent wheel to impart rotation to the former.

2. A tilling implement comprising a cultivating roller consisting of a plurality of rotatable wheels mounted coaxially side by side and having a periphery and spokes or radial arms carrying said periphery, the center wheel being provided upon one spoke with a lateral lug entering the space between the spokes of an adjacent wheel whereby to engage a spoke of said adjacent wheel.

3. A tilling implement comprising a frame, a cultivating roller mounted in the lower portion of said frame and provided with radial teeth around its periphery at intervals, a seed box supported on the frame above the roller, a seed-dropping roller mounted in the bottom of the seed box, a trip arm pivoted upon the seed roller and arranged in the path of teeth on the cultivating roller, and means for yieldably holding the seed roller in seed-receiving position.

4. A tilling implement comprising a frame, a cultivating roller mounted in the lower portion of the frame and provided with radial teeth upon its periphery, a seed box mounted upon the upper portion of the frame, a seed roller in the bottom of the seed box having a seed-receiving pocket extending longitudinally thereof, a seed ejector adjustably mounted in the seed pocket, and means on the roller to be engaged by the teeth of the cultivating roller for shifting the seed roller to seed-discharging position.

5. A tilling implement comprising a frame, a cultivating roller mounted in the lower portion of the frame and provided with radial teeth at intervals around its periphery, a seed box mounted on the upper portion of the frame, a seed roller in the bottom of the seed box, a trip arm pivoted upon the seed roller and depending into the path of the teeth on the cultivating roller whereby the seed roller may be rocked when the cultivating roller is moved in one direction but will remain at rest when the cultivating roller is moved in the opposite direction, yieldable means for holding the seed roller normally in seed-receiving position, and means to limit the rocking movement of the seed roller.

In testimony whereof I affix my signature.

JOHN J. SPAETH.